United States Patent [19]
Schnell et al.

[11] Patent Number: 6,107,568
[45] Date of Patent: Aug. 22, 2000

[54] ELECTRICAL BOX AND HOLDING DEVICE FOR USE THEREWITH

[75] Inventors: Kenneth R. Schnell; Gregory J. Kesler, both of South Bend, Ind.; Robert W. Jorgensen, Niles, Mich.

[73] Assignee: Hubbell Incorporated, Orange, Conn.

[21] Appl. No.: 09/040,934

[22] Filed: Mar. 19, 1998

[51] Int. Cl.⁷ ................................................ H02B 1/30
[52] U.S. Cl. .................. 174/61; 174/54; 174/63; 220/3.3; 248/544; 383/9
[58] Field of Search .................. 174/61, 54, 63; 312/3, 4; 248/544; 220/3.3, 3.4, 3.9, 693; 383/9; 206/806

[56] References Cited

U.S. PATENT DOCUMENTS

| | | | |
|---|---|---|---|
| 3,646,723 | 3/1972 | Meroney | 53/290 |
| 3,756,497 | 9/1973 | Hadfield | 220/3.3 |
| 4,315,100 | 2/1982 | Haslbeck et al. | 174/51 |
| 4,424,407 | 1/1984 | Barbic | 174/67 |
| 4,580,689 | 4/1986 | Slater . | |
| 4,620,815 | 11/1986 | Goetter | 411/84 |
| 4,666,055 | 5/1987 | Lewis . | |
| 4,953,708 | 9/1990 | Beer et al. | 383/211 |
| 4,954,667 | 9/1990 | Jorgensen et al. | 174/53 |
| 5,276,279 | 1/1994 | Brownlie et al. | 174/65 R |
| 5,407,088 | 4/1995 | Jorgensen et al. | 220/3.9 |
| 5,522,577 | 6/1996 | Roesch | 248/343 |
| 5,632,846 | 5/1997 | Ross | 156/308.4 |

*Primary Examiner*—Dean A. Reichard
*Assistant Examiner*—Dhiru R Patel
*Attorney, Agent, or Firm*—Jerry M. Presson; Thomas P. Hilliard; Alfred N. Goodman

[57] ABSTRACT

An electrical box and a holding device for use therewith is disclosed. The holding device can be a flexible plastic bag-like container having a first wall coupled to a second wall and forming a substantially enclosed inner receiving area. A mounting fastener such as fan or fixture mounting screws are temporarily secured within the receiving area of the container. A box mounting screw extends completely through the container and extends through a side of the electrical box to temporarily secure the container and the electrical box to a structure; such as a joist. The fan or fixture mounting screws are then accessible for removal from the container and can be used to further fix the electrical box and the fan or fixture to the joist. The electrical box also has a pair of slots for receiving the fan or fixture mounting screws. Each slot has two areas for receiving a screw with a knockout between the areas. The knockout can be removed if the screw must be positioned between the two areas.

32 Claims, 6 Drawing Sheets

ELECTRICAL BOX AND HOLDING DEVICE FOR USE THEREWITH

FIELD OF THE INVENTION

The invention relates generally to an electrical box and to a holding device for temporarily securing items. More specifically, the invention relates to an electrical box that attaches directly to a support member such as a joist, the box being capable of accommodating ceiling fan and lighting fixture mounts of various mounting screw spacings. Also, the invention more specifically relates to a container for holding the fan/fixture mounting screws in an easily accessible location during installation of the electrical box.

BACKGROUND OF THE INVENTION

Typically, installing an electrical box to a ceiling joist is cumbersome. An installer must keep control of the electrical box itself in addition to all of the other elements of the assembly and the tools to be used during the installation. Often, one or more of the items necessary for installation of the electrical box are dropped by the installer, resulting in frustration for the installer and delay. Additionally, various tasks are often performed after an initial installation step, but before the final installation step, requiring the installer to keep track of various items necessary for final installation. Further, if the mounting bracket of the ceiling fan or lighting fixture does not line up with the mounting holes in the electrical box, the installer is often required to make various inconvenient and difficult accommodations to properly mount the ceiling fan or lighting fixture.

Although various electrical boxes have been developed, none of the prior art devices adequately satisfy the above-mentioned problems.

Examples of prior art electrical boxes are disclosed in the following U.S. Pat. No. 1,800,484 to Thomas, Jr.; U.S. Pat. No. 4,843,189 to Jorgensen et al.; U.S. Pat. No. 5,025,944 to Rodick; and U.S. Pat. No. 5,407,088 to Jorgensen et al., and in Canadian Patent Application Serial No. 2,137,987 to Kerr.

Thus, there is a continuing need to provide elements for facilitating the installation of electrical boxes, especially with respect to the installation of ceiling fans and lighting fixtures. This invention addresses these needs in the art as well as other needs, which will become apparent to those skilled in the art once given this disclosure.

SUMMARY OF THE INVENTION

One object of the present invention is to provide an improved electrical box and a holding device for use especially with electrical boxes.

Still another object of the invention is to provide an electrical box being capable of accommodating ceiling fan and lighting fixture mounts of various mounting screw spacings.

Yet another object of the invention is to provide a container for holding items in an easily accessible location.

A further object of the invention is to provide a container for holding mounting screws in an easily accessible location during installation of an electrical box.

The foregoing objects are basically attained by providing a holding device, comprising a container having a first wall coupled to a second wall, the first and second walls forming a substantially enclosed inner receiving area; a stored item temporarily secured within the receiving area; and a first fastener extending completely through both the first wall and the second wall for securing the container to an apparatus.

The foregoing objects are also attained by providing a mounting assembly, comprising an electrical box having a first side with a first opening extending therethrough; a container having a first wall and a receiving area; a stored item temporarily secured within the receiving area; and a first fastener coupled to the container and extending through the first opening, the first fastener securing the container to the first side of the electrical box.

The foregoing objects are further attained by providing an electrical box, comprising a first side; a first slot extending completely through the first side; the first slot being defied by a perimeter formed in the first side, the perimeter having a first area and a second area, the second area having a first wall; and a first knockout having a main portion and a first narrow portion, the first narrow portion coupled to and extending between the first wall of the second area and the main portion, the narrow portion being removably attached to the first wall, the main portion being positioned within the first slot and forming, together with the perimeter, a first opening in the first slot, the first opening having a first width across the first slot and being adapted to receive a fastener therethrough, the main portion having a second width across the first slot, the second width being substantially identical to the first width.

The foregoing objects are further attained by providing a method of attaching an electrical box, comprising the steps of providing an electrical box; providing a container with a first fastener coupled thereto; providing a stored item secured within the container; securing the electrical box to a support member by the first fastener while the container remains coupled to the first fastener; and removing the stored item from the container.

The foregoing objects are further attained by providing a method of attaching an electrical box, comprising the steps of providing an electrical box having a first slot with a first area and a first knockout positioned in the first area within the slot; attaching the electrical box to a support member; removing the knockout from the first slot; and inserting a fastener through the first area of the slot, which was previously occupied by the knockout.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
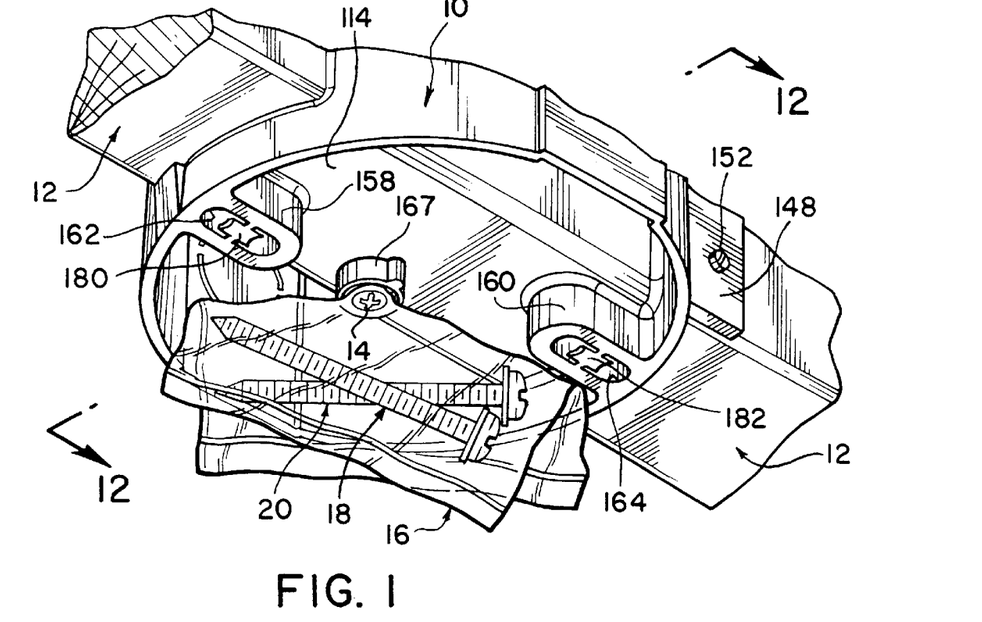
FIG. 1 is a bottom-front-side perspective view of an electrical box in accordance with the present invention temporarily being held to a joist by a box mounting screw while fan/fixture mounting screws are in a bag hanging from the box mounting screw.
Figure 2:
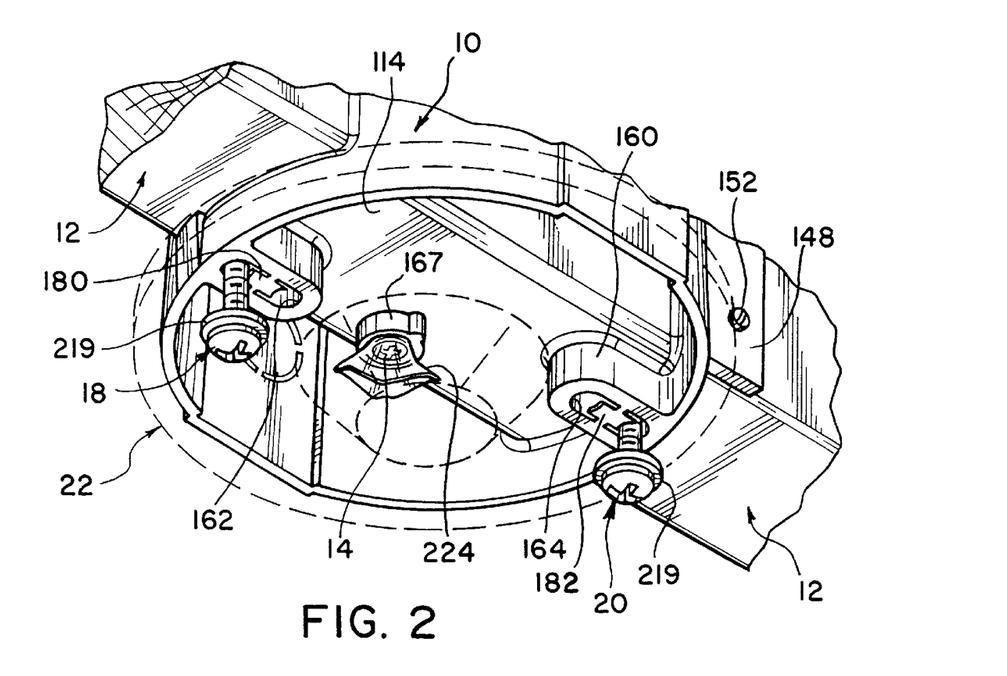
FIG. 2 is a bottom-front-side perspective view of the electrical box in accordance with the present invention held to a joist by a box mounting screw and by two fan/fixture mounting screws, which proceed through a ceiling fan or light fixture (illustrated in dashed lines) and the electrical box before entering the joist.
Figure 3:
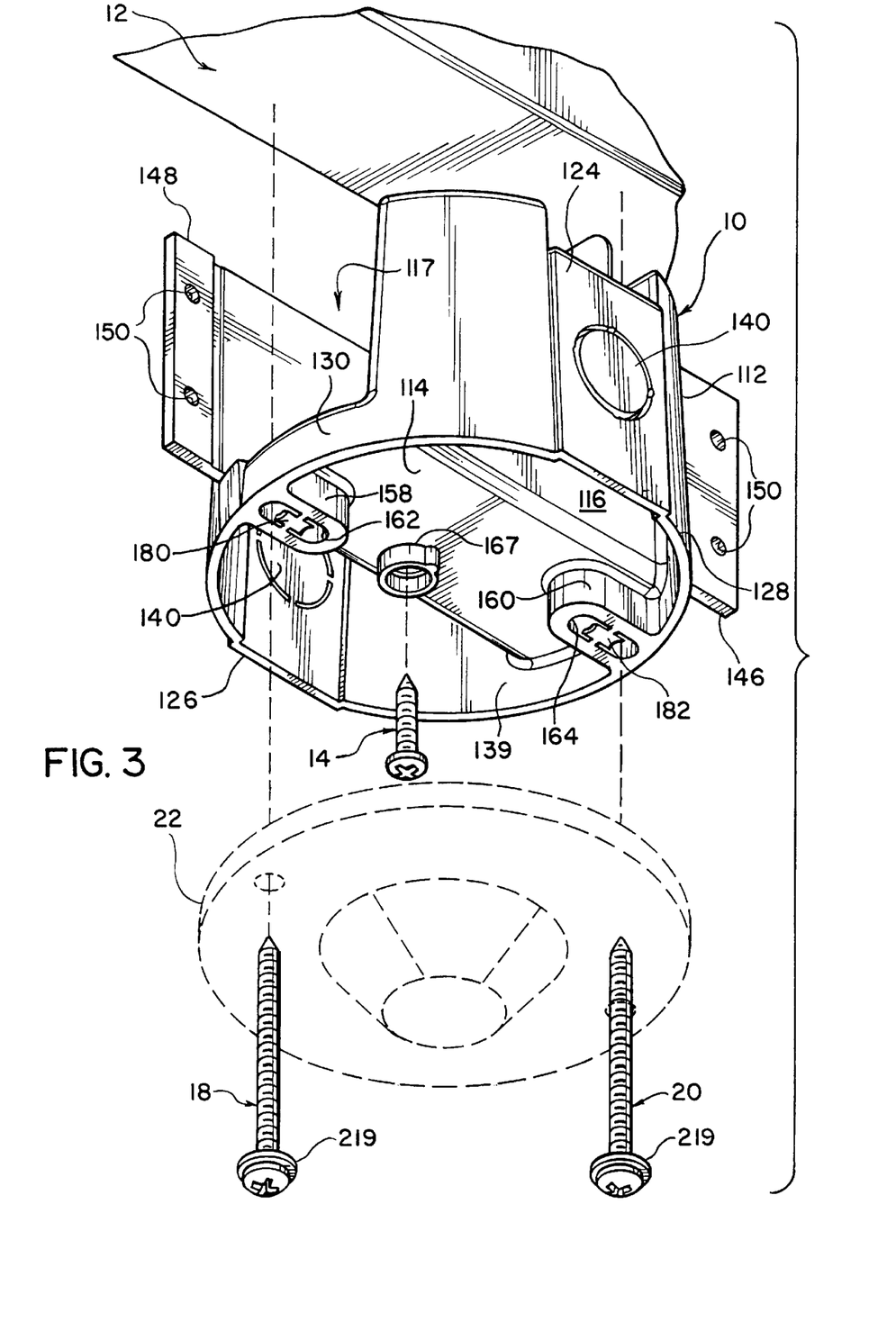
FIG. 3 is an exploded view of the electrical box in accordance with the present invention along with a joist, a box mounting screw, a ceiling fan or light fixture, and fan/fixture mounting screws.
Figure 4:
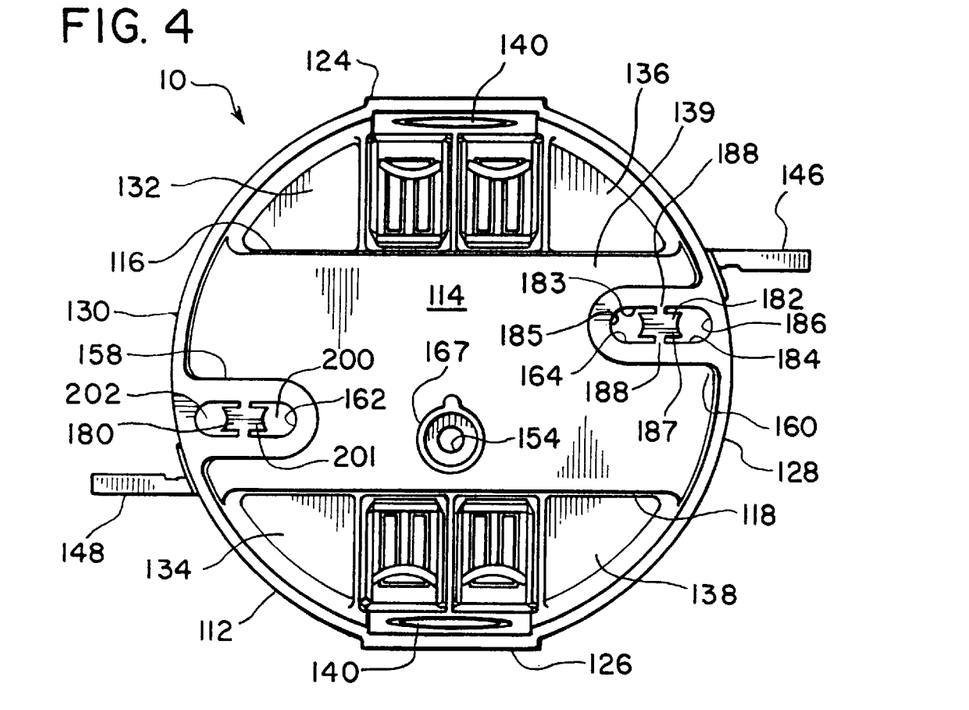
FIG. 4 is a bottom view of the electrical box in accordance with the present invention.
Figure 5:
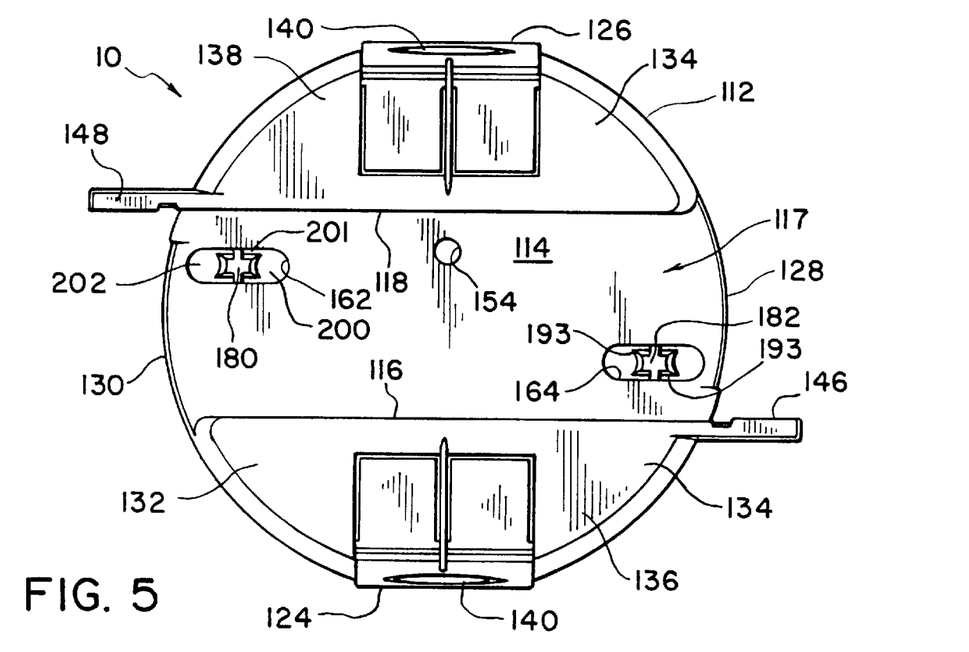
FIG. 5 is a top view of the electrical box in accordance with the present invention.
Figures 6, 7:
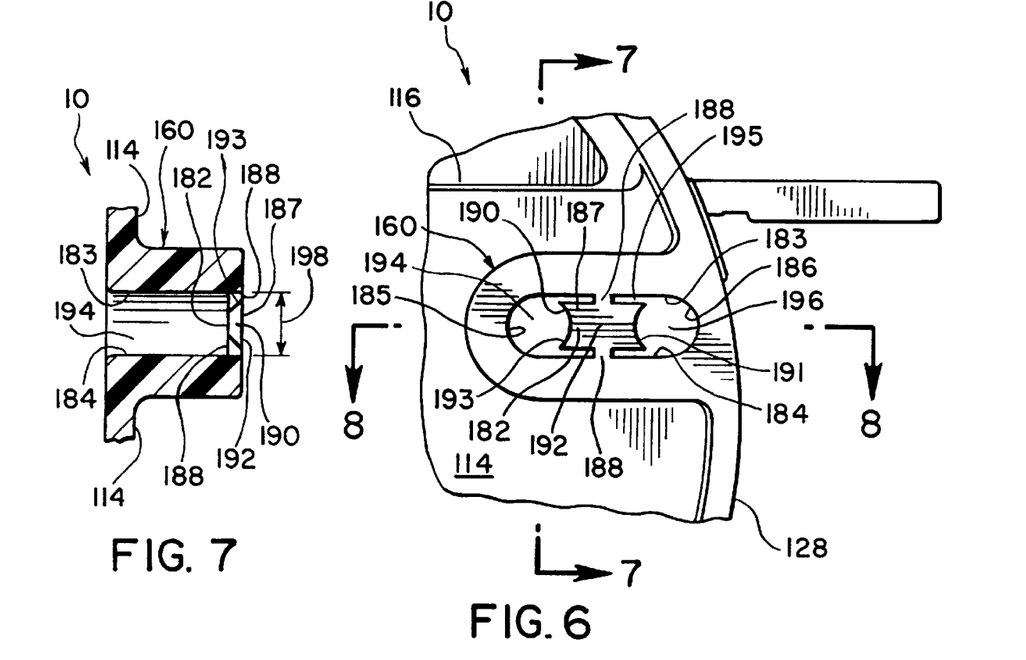
FIG. 6 is an enlarged, partial view of a fan/fixture mounting boss of the electrical box in accordance with the invention.
FIG. 7 is a cross-sectional view of the fan/fixture mounting boss, taken along line 7—7 of FIG. 6.
Figure 8:
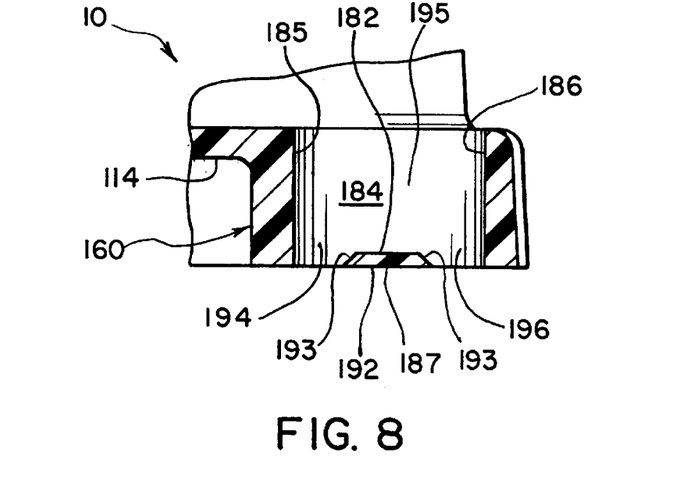
FIG. 8 is a cross-sectional view of the fan/fixture mounting boss, taken along line 8—8 of FIG. 6.

FIGS. 1 and 2 illustrate an electrical box 10 in accordance with the present invention attached to a structure 12; such as a joist. As seen in FIG. 1, a box mounting fastener 14; such as a screw, initially secures box 10 to joist 12. Screw 14 also attaches a container 16; such as a bag having items stored therein, to box 10. Bag 16 preferably contains fan/fixture mounting fasteners 18 and 20; such as screws, to enable easy access of screws 18 and 20 for the installer of box 10. As seen in FIG. 2, screws 18 and 20 secure an apparatus 22; such as a ceiling fan or a lighting fixture, to both box 10 and joist 12.

Referring to FIGS. 1–12, electrical box 10 is preferably for supporting a ceiling fan or a lighting fixture 22, and comprises a body member 112 having a lower wall 114 and first and second side walls 116 and 118 defining a joist receiving recess 117 for snugly receiving a structural member, such as ceiling joist 112 therein. Electrical box 10 further includes a box mounting hole 154 for receiving box mounting fastener 14 to couple the electrical box 10 to the joist 12, and first and second mounting bosses 158 and 160 having first and second slotted openings 162 and 164, respectively, for receiving screws 18 and 20 to couple ceiling fan or lighting fixture 22 to electrical box 10 and to joist 12. Electrical box 10 is similar to prior art electrical boxes; such as to U.S. Pat. No. 5,407,088 to Jorgensen et al. Therefore, the basic structure of electrical box 10 will be described only briefly herein. U.S. Pat. No. 5,407,088 to Jorgensen et al. is hereby incorporated herein by reference.

Preferably, electrical box 10 is formed as a one-piece, unitary, integrally molded member from a suitable non-metallic material, such as a thermoplastic or thermoset composition, which is preferably substantially rigid, i.e., not readily flexible.

Referring now more specifically to the construction of ceiling box 10, body member 112 includes a lower wall 114 that is substantially rectangular and planar. The lower wall 114 is coupled to opposed side walls 116 and 118 which extend perpendicularly upward from the lower wall 114 and are substantially planar and parallel to each other. The lower wall 114 and side walls 116 and 118 define the joist receiving recess 117, which is substantially rectangular in cross section. Preferably, joist receiving recess 117 is sized to snugly receive joist 12 therein to maintain intimate contact between the ceiling box 10 and the ceiling joist 12. Accordingly, when the ceiling box 10 is fit around a ceiling joist 12, the ceiling box 10 will not rotate, slide or rock back and forth. It will be readily understood by those skilled in the art that ceiling box 10 can be constructed specifically to fit a specific size of ceiling joist. This invention can also be adapted to fit joists that are not rectangular in cross section by shaping the lower wall and side walls accordingly, or by creating an interference fit by placing a pad of appropriate spacing material on brackets 146 and 148.

The body member 12 further includes an outer wall structure formed by first and second outer walls 124 and 126, first and second end walls 128 and 130, and first and second top sides or top walls 132 and 134. The first and second top walls 132 and 134 are planar and extend outwardly from the first and second side walls 116 and 118, respectively. The first and second outer walls 124 and 126 are partially planar and partially curved and extend downwardly from the top walls 132 and 134, respectively, and are each coupled to the two ends of the first and second side walls 116 and 118, respectively.

The first side wall 116, first top wall 132 and first outer wall 124 form an enclosed first lobe or cavity 136 of the body member 12. Second side wall 118, second top wall 134 and second outer wall 126 form an enclosed second lobe or cavity 138 of the body member 112. In combination with the space defined below the lower wall 114, the first and second lobes 136 and 138 define a substantially U-shaped inner cavity 139 in the body member 112. As packaged for sale, bag 16 with screws 18 and 20 and with screw 14 extending therethrough is inserted into cavity 139 for storage. Preferably, bag 16 is placed within one of lobes 136 and 138, and an instruction sheet is placed within the other of lobes 136 and 138.

Each of the side walls 124 and 126 may have one or more break out windows 140 which can be selectively broken off to create openings for connecting fittings to side walls 124 and 126, which in turn secure a cable, conduit or tubing thereto.

As seen in FIGS. 1–5, the body member 112 also includes first and second brackets 146 and 148 being coupled to and extending outwardly from body member 112 in opposite directions. The first and second brackets 146 and 148 are substantially planar and lie in substantially parallel planes. The first bracket 146 extends from the first side wall 116 to form a first substantially planar surface with first side wall 116 for contacting one side of joist 12, while the second bracket 148 extends from the second side wall 118 to form a second substantially planar surface with second side wall 118 for contacting the other side of joist 12. The brackets 146 and 148 may also include a series of apertures 150 for receiving bracket screws 152 to allow the brackets 146 and 148 to be attached to joist 12.

Referring now to FIGS. 1–4, electrical box 10 of the present invention further includes a box mounting hole 154 for receiving box mounting screw 14. Box mounting hole 154 extends completely through lower wall 114 to enable screw 14 to extend through lower wall 114 and into joist 12. Also, although box mounting hole 154 can be positioned anywhere on lower wall 114, box mounting hole 154 is preferably off-center with respect the width of lower wall 114. In other words, when screw 14 is inserted through box mounting hole 154, screw 14 will enter joist 12 at a location other than in the center of joist 12. Additionally, an upstanding cylindrical wall 167 extends from lower wall 114 and surrounds box mounting hole 154 for additional strength and to isolate the box mounting screw 14 from the electrical wiring (not shown) of the fan or fixture.

Mounting bosses 158 and 160 extend from end walls 128 and 130, respectively, and from lower wall 114. Boss 158 has slotted opening 162 extending completely therethrough except for where a first knockout 180 is positioned within slotted opening 162 and extending across slotted opening 162 at the lowermost portion of boss 158. Boss 160 has slotted opening 164 extending completely therethrough and a second knockout 182 extending across slotted opening 164 at the lowermost portion of boss 160.

Since mounting bosses 158 and 160 and their respective slotted openings 162 and 164 and knockouts 180 and 182 are substantially identical., only mounting boss 160 will be described in detail. Slotted opening 164 is defined by boss 160. In particular, slotted opening 164 has first and second spaced, substantially parallel sides 183 and 184, respectively. The ends of each parallel side 183 and 184 are joined together by substantially semi-circular sides 185 and 186.

Knockout 182 extends within slotted opening 164 and has a main portion 187 and two narrow portions 188. Each narrow portion 188 connects main portion 187 to one of the parallel sides 183 and 184. Knockout 182 is made integrally, as a unitary, one-piece member with mounting boss 160.

Main portion 187 has two, opposite semi-circular ends 190 and 191, and a lowermost surface 192 that is substantially flush with the lowermost surface of mounting boss 160. Main portion 187 also has a tapered edge 193 extending completely around main portion 187, except where main portion 187 is coupled to narrow portions 188. Tapered edge facilitates inserting a tool into slotted opening 164 and prying knockout 182 from mounting boss 160.

Slotted opening 164 has an inner area 194, a middle area 195 and an outer area 196. Inner area 194 is generally circular and formed by end 190 of knockout 182 and side 185 of slotted opening 164. Outer area 196 is also generally circular and formed by end 191 of knockout 182 and side 186 of slotted opening 164. Finally, middle area 195 is between inner and outer areas 194 and 196, and is basically the portion of slotted opening 164 covered by knockout 182.

Each of the areas 194, 195 and 196 are capable of receiving one of mounting screws 18 and 20. The diameter of semi-circular sides 185 and 186 and the diameter of inner and outer areas 194 and 196 are substantially identical to the distance 198 between parallel sides 183 and 184. Thus, the diameter of inner and outer areas 194 and 196 is substantially identical to the width of middle area 195. This similarity in size between areas 194, 195, and 196 allows one of mounting screws 18 and 20 to be positioned a number of locations within slotted opening 164.

Figure 9:
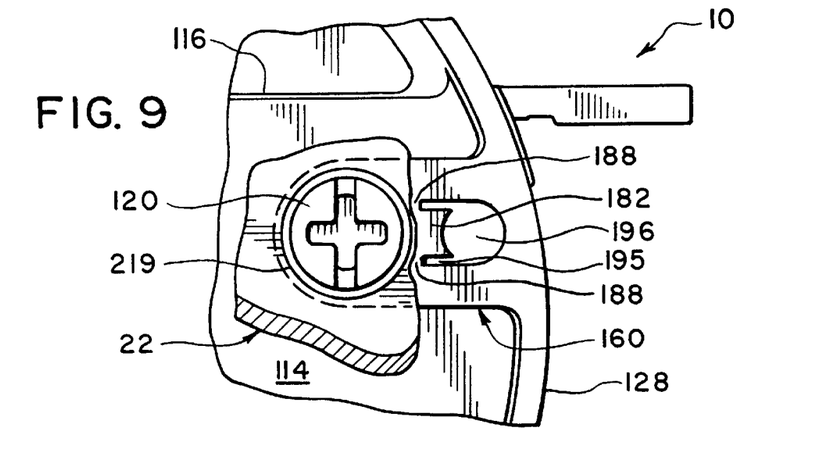
FIG. 9 is an enlarged, partial view of a fan/fixture mounting boss of the electrical box in accordance with the invention with a ceiling fan or lighting fixture attached thereto, and with the fan/fixture mounting screw in an inner position within the mounting boss.
Figure 10:
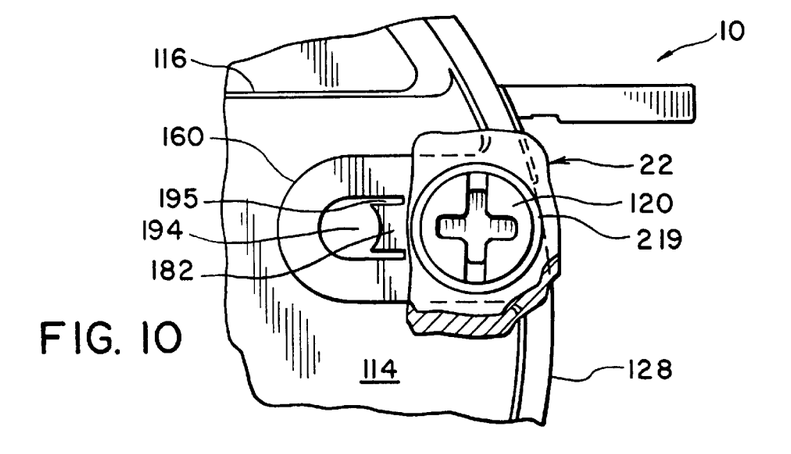
FIG. 10 is an enlarged, partial view of a fan/fixture mounting boss of the electrical box in accordance with the invention with a ceiling fan or lighting fixture attached thereto, and with the fan/fixture mounting screw in an outer position within the mounting boss.

The spacing between the inner area 194 of slotted opening 164 and the inner area 200 of slotted opening 162 accommodates a first common fan or fixture 22 center to center spacing of mounting screws 18 and 20. The spacing between the outer area 196 of slotted opening 164 and the outer area 202 of slotted opening 162 accommodates a second common fan or fixture 22 center to center spacing for mounting screws 18 and 20. Thus, an installer can easily mount a fan or fixture 22 when the required distance between the center of screw 18 to the center of screw 20 matches the distance between the centers of inner areas 194 and 200 or between the centers of outer areas 196 and 202. Preferably, the center to center distance between inner areas 194 and 200 is approximately 2.562 inches and the center to center distance between outer areas 196 and 202 is approximately 3.500 inches. FIG. 9 illustrates mounting screw 20 positioned in inner area 194, while FIG. 10 illustrates mounting screw 20 positioned in outer area 196.

Additionally, an installer of fan or fixture 22 can, with minimal effort, mount a fan or fixture 22 that receives mounting screws 18 and 20 where the distance between the center of screw 18 to the center of screw 20 does not match the distance between inner areas 194 and 200 or between outer areas 196 and 202, but falls somewhere in-between. In this case, the installer performs the easy step of removing knockouts 180 and 182 so that screws 18 and 20 can be inserted into the middle area 195 of slotted opening 164 and middle area 201 of slotted opening 164.

Figure 11:
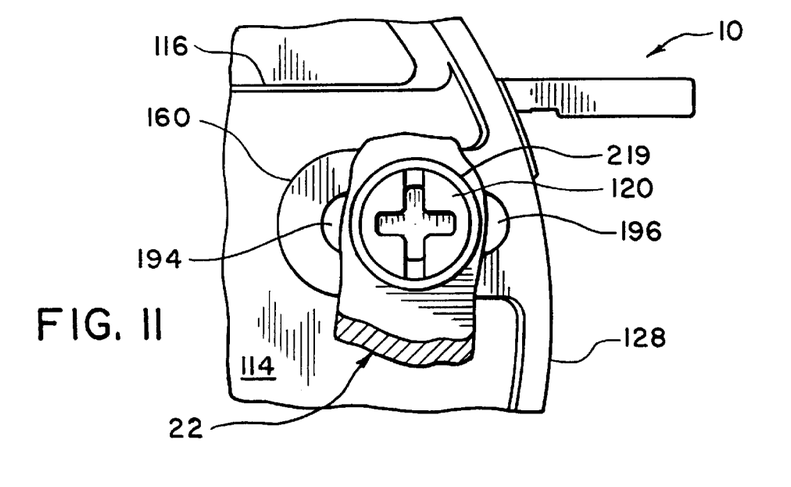
FIG. 11 is an enlarged, partial view of a fan/fixture mounting boss of the electrical box in accordance with the invention with a ceiling fan or lighting fixture attached thereto, and with the fan/fixture mounting screw in a middle position within the mounting boss after the knockout has been removed.

Knockouts 180 and 182 can be removed in a variety of ways; for example, by striking knockouts 180 and 182 with a blunt nosed tool or by prying the knockouts 180 and 182 using a sharper tool. FIG. 11 illustrates mounting screw 20 positioned in middle area 195 after knockout 182 has been removed. It should be understood that although FIG. 11 illustrates mounting screw 20 centrally position in slotted opening 164, the removal of knockout 182 permits the positioning of screw 20 at any location within slotted opening 164.

Preferably, the slotted openings 162 and 164 are located in the opposite corners at opposite sides and ends of the lower wall 114 and oriented to allow fan/fixture mounting screws 18 and 20 to be inserted from the underside of the lower wall 14 to screw into joist 12, thereby directly mounting ceiling box 10 as well as fan or fixture 22 to joist 12. Placing the slotted openings 162 and 164 at opposite corners of the lower wall 114 allows for increased stability and helps prevent the joist from splitting.

Container 16 can take many shapes and sizes and can be made from various materials. Preferably, container 16 is a bag having a first wall 210 having a perimeter 212 and a second wall 214 having a perimeter 216. Walls 212 and 214 being connected to each other along their respective perimeters 212 and 216 to form a inner receiving area or pocket 218. Pocket 218 enables items to be stored within bag 16.

Although pocket 218 can contain a variety of items, preferably, pocket 218 contains two fan/fixture mounting screws 18 and 20. Each screw 18 and 20 having a lock washer 219 thereon to help maintain the screws 18 and 20 in their installed positions in joist 12, once installation is accomplished The fan/fixture mounting screws 18 and 20 are preferably two inches long and are number 12–14 screws. Although fasteners 18 and 20 are illustrated as a screws, it should be understood that other appropriate fasteners can be employed as desired or as necessary.

Each wall 210 and 214 of bag 16 is preferably a substantially flat sheet of flexible material. For example, bag 16 can be made of thin, substantially transparent plastic material as is known in the art bag 16 can be formed in a variety of ways known in the art. Preferably, bag 16 is formed of a single, unitary sheet of thin, flexible plastic material that is folded on top of itself at fold line 220 and has a heat seal 222 extending around the remainder of the periphery.

As seen in FIGS. 1 and 12–14, bag 16 is made accessible during installation of electrical box 10 by having box mounting screw 14 extending completely through bag 16. That is, screw 14 extends completely through both walls 210 and 214. Screw 14 is inserted through bag 16 sufficiently to allow a majority, if not all of the threads to pass through bag 16. This enables the threads of screw 14 to maintain bag 16 in a fixed position with respect to screw 14. Since bag 16 is preferably made from resilient material, the hole in each of the walls 210 and 214 made by screw 14 stretches around the threads of screw 14, but the holes do not permanently deform to the outside diameter of the threads of screw 14. Instead, they return back to a size smaller than the outside diameter of the threads of screw 14, allowing the threads to lock bag 16 on screw 14. Screw 14 is positioned at approximately the center of bag 16. Although fastener 14 is illustrated as a screw, it should be understood that other appropriate fasteners can be employed as desired or as necessary. Additionally, although fastener 14 is illustrated as being attached to electrical box 10, fastener 14, with bag 16 attached, can be attached to various apparatus to facilitate the handling of the contents stored within bag 16.

Installation

Figure 12:
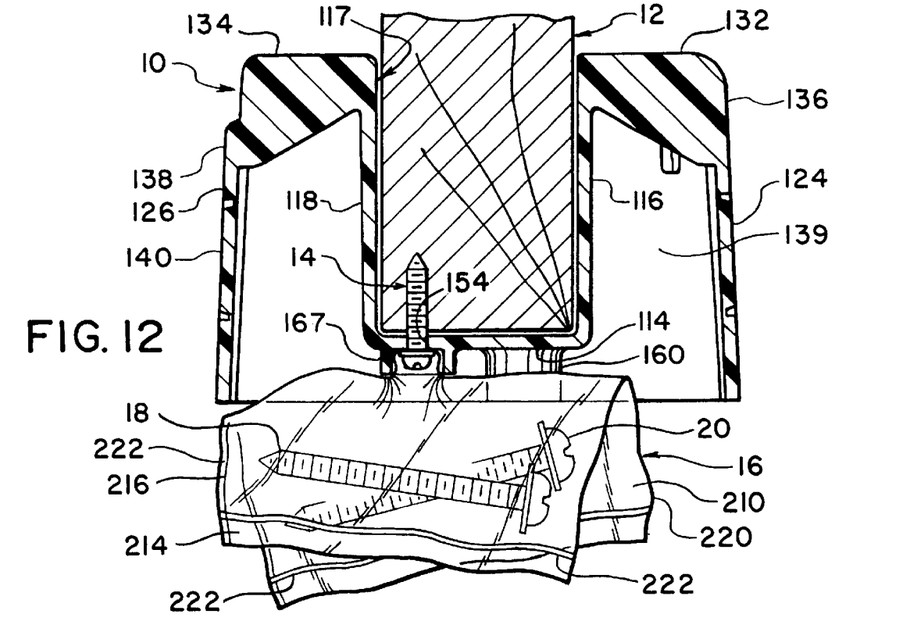
FIG. 12 is a cross-section view of the electrical box in accordance with the invention, taken along line 12—12 of FIG. 1.
Figure 13:
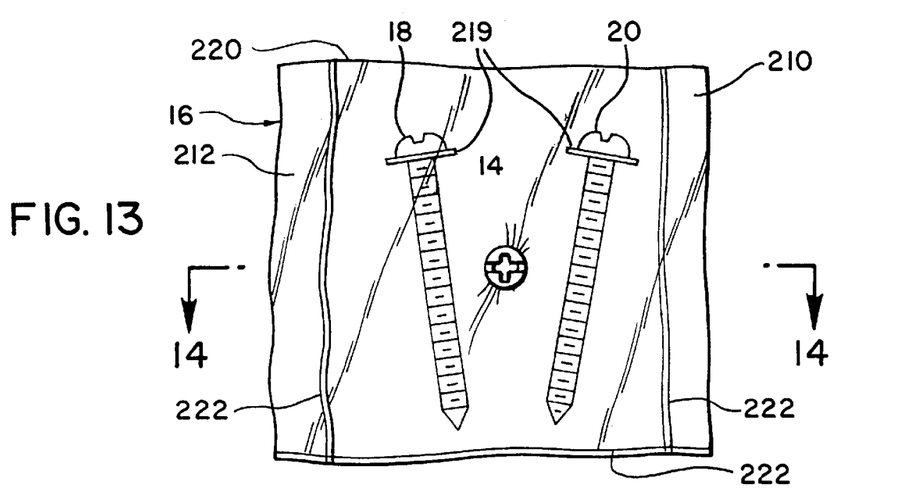
FIG. 13 is a front, elevation view of a holding bag in accordance with the present invention, with two fan/fixture mounting screws within the bag and with a box mounting screw extending through the bag walls.
Figure 14:
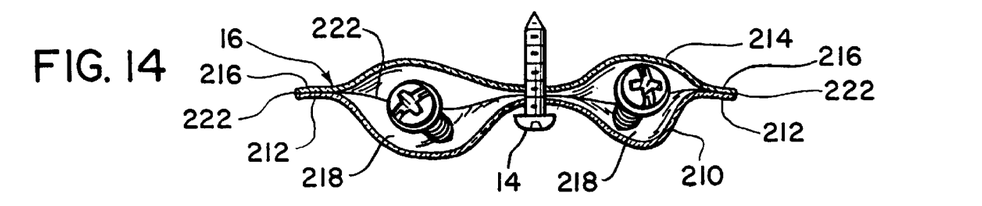
FIG. 14 is a cross-sectional view of the holding bag in accordance with the present invention, taken along line 14—14 of FIG. 13.

Electrical box 10 and ceiling fan or lighting fixture 22 can be attached to joist 12 in a variety of ways, preferably, the installation occurs in the following manner for new construction. Electrical box 10 is placed adjacent joist 12 so that joist 12 is fully inserted within joist receiving recess 117. Box mounting screw 14, with bag 16 containing fan/fixture mounting screws 18 and 20 and lockwashers 219 securely attached thereto, is then inserted through box mounting hole 154 and into joist 12, as seen in FIGS. 1 and 12. This provides an initial attachment of electrical box 10 to joist 12 so that additional securing to electrical box 10 can occur more easily. Additionally, bag 16 provides a convenient way to avoid the misplacing or dropping of screws 18 and 20 during installation. Further, screws 18 and 20 are stored in an easily accessible place while electrical wiring is accomplished and while drywall is installed around electrical box 10.

Pilot holes must next be drilled into joist 12 for receiving fan/fixture mounting screws 18 and 20. Preferably, pilot holes are ⅛ inch in diameter. Slotted openings 162 and 164 provide guidance for this drilling as the drill passes through slotted openings 162 and 164 into joist 12. In other words, electrical box 10 acts as a drill template. The specific ceiling fan or lighting fixture will determine whether the holes drilled in joist 12 are aligned with inner areas 194 and 200, with outer areas 196 and 202, or with middle areas 195 and 202. As discussed above, if it is necessary to pass screws 18 and 20 through middle areas 195 and 202, knockouts 180 and 182 must first be removed.

Once the pilot holes are complete, fan/fixture mounting screws 18 and 20 are removed from bag 16. One of screws 18 or 20 is inserted through its appropriate opening in ceiling fan or lighting fixture 22, through one of the slotted openings 162 and 164, and into one of the pilot holes in joist 12. This step is repeated for the other of screws 18 or 20, through its respective openings in fan or fixture 22 and electrical box 10 and into the other pilot hole in joist 12. As seen in FIG. 2, once both screws 18 and 20 are fully installed and secured to joist 12, electrical box 10 and fan or fixture 22 are structurally installed.

It should be understood that the removal of screws 18 and 20 from bag 16 can be accomplished in a variety of ways. For example, one of screws 18 or 20 can be removed, while the other of screws 18 and 20 remains in bag 16 until after the first removed screw 18 or 20 is fully inserted into joist 12. Alternatively, the majority of bag 16 and both screws 18 and 20 can be removed from box mounting screw 14 simultaneously. Regardless of the method employed, bag 16 is preferably removed from its attachment to box mounting screw 14 once installation is complete and then discarded. This minimizes clutter in electrical box 10. However, bag 16 in its entirety, or a small portion 224 of bag 16 remaining attached to screw 14 after partial removal of bag 16 as seen in FIG. 2, may remain within electrical box 10.

Additionally, since box mounting screw 14 is intended to secure electrical box 10 to joist 12 only during installation of fan/fixture mounting screws 18 and 20, screw 14 can be removed and discarded once screws 18 and 20 are installed. Preferably, screw 14 remains attached to joist 12 and further secures electrical box 10 to joist 12.

It should be understood that for remodeling, side brackets 146 and 148 can be cut off from electrical box 10 so that the cuts are flush with ends 128 and 130, respectively. Electrical box is then centered on joist 12 and a circular hole is cut through the ceiling sheet rock to permit 10 the insertion of electrical box 10 therethrough. The installation then continues as described above with respect to new construction.

While advantageous embodiments have been chosen to illustrate the invention, it will be understood by those skilled in the art from this disclosure that various changes and modifications can be made therein without departing from the scope of the invention as defined in the appended claims.

What is claimed is:

1. A holding device, comprising:
   a container having a one-piece, integral first wall coupled to a one-piece, integral second wall, said first and second walls forming a completely enclosed inner receiving area, said first wall having a main portion and an outer perimeter extending completely around said main portion of said first wall, said second wall having a main portion and an outer perimeter extending completely around said main portion of said second wall, the entire extent of said outer perimeter of said first wall being directly attached to said outer perimeter of said second wall and the entire extent of said outer perimeter of said second wall being directly attached to said outer perimeter of said first wall;
   a mounting fastener for being easily accessible during installation of an electrical box, completely enclosed in said container; and a first fastener extending completely through both said main portion of said first wall and said main portion of said second wall for securing said container to an apparatus.

2. A holding device according to claim 1, wherein said container is formed entirely of a flexible material.

3. A holding device according to claim 2, wherein said flexible material is plastic.

4. A holding device according to claim 3, wherein said plastic is substantially transparent.

5. A holding device according to claim 2, wherein each of said first and said second walls is a sheet that is directly attached to the other of said first and second walls at its respective said outer perimeter.

6. A holding device comprising:
   a container having a first wall coupled to a second wall, said first and second walls forming a substantially enclosed inner receiving area;
   a mounting fastener for being easily accessible during installation of an electrical box, completely enclosed in said inner receiving area; and a first fastener extending completely through both said first wall and said second wall for securing said container to an apparatus, said container is formed entirely of a flexible container, each of said first and said second walls is a sheet that is directly attached to the other of said first and second walls at said outer perimeter of said first and second walls, said first and second walls being a single, unitary sheet of material, and said first and second walls being directly attached to each other at said outer perimeter of said first wall and at said outer perimeter of said second wall by a fold line and a heat seal.

7. A holding device according to claim 6, wherein
said first fastener is threaded.

8. A holding device according to claim 7, wherein
said first fastener is a screw.

9. A holding device according to claim 8, wherein
said stored item includes at least one second fastener.

10. A mounting assembly, comprising an electrical box having a first side with a first opening extending therethrough;

a container having a first wall, a second wall, and a receiving area, said second wall being coupled to said first wall and said receiving area being substantially enclosed by said first and second walls;

a mounting fastener for being easily accessible during installation of said electrical box, completely enclosed in said container; and each of said first wall and said second wall are a sheet having a perimeter, and said perimeter of said first wall and said perimeter of said second wall being directly attached to each other, and a first fastener coupled to said container and extending through said first opening, said first fastener securing said container to said first side of said electrical box.

11. A mounting assembly according to claim 10, wherein
said first fastener extends completely through both said first wall and said second wall for securing said container to said first side of said electrical box.

12. A mounting assembly according to claim 11, wherein
said container is formed entirely of a flexible material.

13. A mounting assembly according to claim 12, wherein
said flexible material is plastic.

14. A mounting assembly according to claim 10, wherein
said electrical box has a second opening, and
said stored item includes at least one second fastener adapted to be received within said second opening.

15. An electrical box, comprising:
a first side;
a first slot extending through said first side; said first slot being defined by a perimeter formed in said first side, said perimeter having a first area and a second area, said second area having a first wall; and
a first knockout having a main portion and a first narrow portion, said first narrow portion coupled to and extending between said first wall of said second area and said main portion, said narrow portion being removably attached to said first wall, said main portion being positioned within said first slot and forming, together with said perimeter, a first opening in said first slot, said first opening having a first width across said first slot and being adapted to receive a fastener therethrough, said main portion having a second width across said first slot, said second width being substantially identical to said first width.

16. An electrical box according to claim 15, wherein
said first slot has a third area, and said second area is positioned between said first and third areas,
said main portion being positioned within said first slot between said first area and said third area, said main portion forming, together with said perimeter, a second opening in said first slot, said second opening having a third width across said first slot and being adapted to receive a fastener therethrough, said third width being substantially identical to said first width.

17. An electrical box according to claim 16, wherein
said first and second openings are substantially circular.

18. An electrical box according to claim 17, wherein
said second area has a second wall spaced from said first wall by said first slot, and
said first knockout has a second narrow portion, opposite said first narrow portion, and removably coupled to said second wall of said second area.

19. An electrical box according to claim 17, wherein
said main portion of said first knockout has first and second semi-circular ends.

20. An electrical box according to claim 19, further comprising:
a second slot substantially identical to said first slot, and
a second knockout within said second slot and substantially identical to said first knockout.

21. A method of attaching an electrical box to a support, comprising the step of:
providing an electrical box;
providing a container with a first fastener coupled thereto;
providing a mounting fastener for being easily accessible during installation of an electrical box, completely enclosed in the container;
securing the electrical box to a support by the first fastener while the container remains coupled to the first fastener; and removing the mounting fastener from the container.

22. A method according to claim 21, further comprising the step of:
removing at least part of the container from the first fastener prior to removing the mounting fastener from the container.

23. A method according to claim 21, further comprising the step of:
using the mounting fastener to further secure the electrical box to the support member.

24. A method according to claim 23, wherein
the step of providing an electrical box includes the electrical box having a first side with first and second openings extending therethrough,
the step of providing a container includes the first fastener being a first threaded fastener for inserting in the first opening of the electrical box, and
the step of providing the mounting fastener further includes the stored item being a second threaded fastener for inserting in the second opening of the electrical box.

25. A method according to claim 21, wherein
the step of providing the container includes the container having a first wall and a second wall coupled to the first wall and a receiving area substantially enclosed by the first and second walls, and the first fastener extending completely through both the first wall and the second wall.

26. A method according to claim 25, wherein the step of providing the container further includes the container being formed entirely of a flexible material.

27. A method according to claim 26, wherein the step of providing the container further includes each of the first wall and the second wall of the container formed of a flat sheet having a perimeter, and the perimeter of the first wall and the perimeter of the second wall being directly attached to each other.

28. A method according to claim 21, wherein the step of providing the container further includes the first fastener being a threaded fastener.

29. A method according to claim 21, wherein the step of providing the stored item further includes the mounting fastener being a threaded fastener.

30. A method according to claim 21, further comprising the step of removing a first part of the container from the first fastener prior to removing the stored item from the container while leaving a second part of the container attached to the first fastener.

31. A method of attaching an electrical box, comprising the steps of:

providing an electrical box having a first slot with a first area and a first knockout positioned in the first area within the slot;

attaching the electrical box to a support member;

removing the knockout from the first slot; and inserting a fastener through the first area of the slot, which was previously occupied by the knockout.

32. A method according to claim 31, wherein the step providing the electrical box includes the electrical box having a first side and the first slot extending through the first side; the first slot being defined by a perimeter formed in the first side, the perimeter having a first area and a second area, the second area having a first wall, the electrical box further having a first knockout having a main portion and a first narrow portion, the first narrow portion coupled to and extending between the first wall of the second area and the main portion, the narrow portion being removably attached to the first wall, the main portion being positioned within the first slot and forming, together with the perimeter, a first opening in the first slot, the first opening having a first width across the first slot and being adapted to receive a fastener therethrough, the main portion having a second width across the first slot, the second width being substantially identical to the first width.

* * * * *